United States Patent
Li et al.

(10) Patent No.: US 10,834,728 B2
(45) Date of Patent: Nov. 10, 2020

(54) METHOD FOR INDICATING QUASI CO-LOCATION INDICATION INFORMATION AND DEVICE

(71) Applicant: Huawei Technologies Co., Ltd., Shenzhen (CN)

(72) Inventors: Zhongfeng Li, Munich (DE); Xinxian Li, Shanghai (CN); Ning Wu, Shanghai (CN); Yi Qin, Kista (SE); Yu Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,523

(22) Filed: Mar. 29, 2019

(65) Prior Publication Data

US 2019/0230646 A1    Jul. 25, 2019

Related U.S. Application Data

(63) Continuation of application No. PCT/CN2017/103771, filed on Sep. 27, 2017.

(30) Foreign Application Priority Data

Sep. 30, 2016    (CN) .......................... 2016 1 0872801
Jan. 5, 2017    (CN) .......................... 2017 1 0008426

(51) Int. Cl.
*H04W 72/00* (2009.01)
*H04W 72/04* (2009.01)
*H04L 5/00* (2006.01)

(52) U.S. Cl.
CPC ......... *H04W 72/048* (2013.01); *H04L 5/0048* (2013.01); *H04L 5/0051* (2013.01);

(Continued)

(58) Field of Classification Search
CPC . H04W 28/18; H04W 72/048; H04W 72/042; H04W 72/0453; H04W 72/0446; H04L 5/0051

(Continued)

(56) References Cited

U.S. PATENT DOCUMENTS

2014/0119266 A1    5/2014  Ng et al.
2015/0146644 A1    5/2015  Kim et al.
(Continued)

FOREIGN PATENT DOCUMENTS

CN    103945447 A    7/2014
CN    104956611 A    9/2015
(Continued)

OTHER PUBLICATIONS

EP/17854908.5-1219, Search Report, dated Aug. 23, 2019.
(Continued)

*Primary Examiner* — Huy C Ho
(74) *Attorney, Agent, or Firm* — Leydig, Voit & Mayer, Ltd.

(57) ABSTRACT

A method for indicating quasi co-location indication information and a device are provided, to diversify reference signal types and reference signal configuration information that are indicated by QCL. The method includes: generating, by a base station, reference signal configuration information; performing, by the base station based on the reference signal configuration information, quasi co-location QCL assumption on reference signals corresponding to at least two antenna ports in reference signals, to generate QCL indication information; and sending, by the base station, the QCL indication information to a terminal.

20 Claims, 3 Drawing Sheets

(52) U.S. Cl.
CPC ..... *H04W 72/042* (2013.01); *H04W 72/0446* (2013.01); *H04W 72/0453* (2013.01); *H04L 5/0023* (2013.01)

(58) Field of Classification Search
USPC ......................................................... 455/450
See application file for complete search history.

(56) References Cited

U.S. PATENT DOCUMENTS

| | | |
|---|---|---|
| 2015/0180625 A1 | 6/2015 | Park et al. |
| 2015/0349940 A1* | 12/2015 | Kim ................... H04J 11/0053 370/329 |
| 2015/0365154 A1* | 12/2015 | Davydov ............... H04B 7/024 370/329 |
| 2016/0174247 A1 | 6/2016 | Ruiz Delgado et al. |
| 2016/0302203 A1* | 10/2016 | Liu ......................... H04L 5/001 |

FOREIGN PATENT DOCUMENTS

| | | |
|---|---|---|
| CN | 104982063 A | 10/2015 |
| CN | 105580467 A | 5/2016 |
| EP | 2905910 A1 | 8/2015 |
| WO | 2014112832 A1 | 7/2014 |

OTHER PUBLICATIONS

"Evaluation of the Impact of QCL Assumptions and Discussion on Potential QCL Configurations," 3GPP RAN WG1 Meeting #86, Gothenburg, Sweden, R1-167199, XP051140570, 3rd Generation Partnership Project, Valbonne, France (Aug. 22-26, 2016).

* cited by examiner

METHOD FOR INDICATING QUASI CO-LOCATION INDICATION INFORMATION AND DEVICE

CROSS-REFERENCE TO RELATED APPLICATIONS

This application is a continuation of International Application No. PCT/CN2017/103771, filed on Sep. 27, 2017, which claims priority to Chinese Patent Application No. 201710008426.5, filed on Jan. 5, 2017 and Chinese Patent Application No. 201610872801.6, filed on Sep. 30, 2016, all of which are hereby incorporated by reference in their entireties.

TECHNICAL FIELD

Embodiments of the present invention relate to the field of communications technologies, and in particular, to a method for indicating quasi co-location indication information and a device.

BACKGROUND

That antenna ports are quasi co-located (QCL) in LTE is a status assumption between the antenna ports. If two antenna ports are quasi co-located, for a terminal, it may be assumed that a large-scale characteristic of signals received from one antenna port (or a radio channel corresponding to the antenna port) is completely or partially the same as a large-scale characteristic of signals received from the other antenna port (or a radio channel corresponding to the antenna port).

However, in the prior art, there are a relatively few types of reference signals and a relatively small amount of reference signal configuration information that are indicated by QCL. Consequently, it is difficult to satisfy requirements of a plurality of scenarios in a new radio (NR) technology.

SUMMARY

An objective of the present invention is to provide a method for indicating quasi co-location indication information and a device, to diversify reference signal types and reference signal configuration information that are indicated by QCL.

The objective of the present invention is achieved by using the following technical solutions.

According to a first aspect, an embodiment of the present invention provides a method for indicating quasi co-location indication information, including: generating, by a base station, reference signal configuration information; performing, based on the reference signal configuration information, quasi co-location QCL assumption on reference signals corresponding to at least two antenna ports in the reference signals, to generate QCL indication information; and sending the QCL indication information to a terminal. QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources. Each piece of reference signal configuration information is corresponding to one reference signal, and each reference signal is corresponding to at least one antenna port. Therefore, according to the method provided in this embodiment of the present invention, based on diversity of the reference signal configuration information, QCL assumption can be performed on a plurality types of reference signals, to generate QCL indication information, thereby satisfying requirements of a plurality of scenarios in NR.

In an optional implementation, the QCL indication information includes information about the at least two antenna ports. Therefore, the method provided in this embodiment of the present invention can support QCL assumption performed on reference signals corresponding to two or more antenna ports, thereby broadening a QCL range.

In an optional implementation, the QCL indication information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an angle of arrival AOA, an average AOA, an AOA spread, an angle of departure AOD, an average angle of departure AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a channel state information reference signal (CSI-RS) resource identifier or a sounding reference signal (SRS) resource identifier, and is used to indicate a beam on a resource.

The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

Therefore, in this embodiment of the present invention, a characteristic of two quasi co-located reference signals is multi-dimensionally described by extending a QCL parameter.

It should be understood that the same parameter herein may be predefined or dynamically adjusted.

In an optional implementation, each piece of reference signal configuration information includes at least one of an antenna port corresponding to a reference signal, a time domain resource occupied by a reference signal, a frequency domain resource occupied by a reference signal, a scrambling identity of a reference signal, and a carrier index of a reference signal. Therefore, in this embodiment of the present invention, the reference signal configuration information may be in a plurality of different forms, so that a reference signal can be defined by using a plurality types of parameters.

In an optional implementation, the reference signals corresponding to the at least two antenna ports have different reference signal types; the reference signals corresponding to the at least two antenna ports have a same reference signal type and different reference signal patterns; or the reference signals corresponding to the at least two antenna ports have a same reference signal type and a same reference signal pattern. The reference signal pattern is a time-frequency location of a resource element at which a reference signal at a preset time-frequency resource granularity is located, and types of the reference signal include a demodulation reference signal, a channel state information reference signal, and a beam reference signal. Therefore, in this embodiment of the present invention, there are various combinations of types and patterns of reference signals, thereby enriching types of the reference signals.

In an optional implementation, the reference signals corresponding to the at least two antenna ports include a reference signal used for phase noise and/or frequency shift estimation. Therefore, in this embodiment of the present invention, QCI assumption can be performed on the reference signal used for phase noise and/or frequency shift estimation and another signal. In addition, the reference signal used for phase noise and/or frequency shift estimation may be different from the another signal in types and patterns, and configuration information of the reference signal used for phase noise and/or frequency shift estimation is generated in various manners.

In an optional implementation, the sending, by the base station, the QCL indication information to a terminal includes: sending, by the base station, the QCL indication information to the terminal by using signaling, where the signaling is a semi-static indication or a dynamic indication, and the signaling is at least one of a downlink control indication, radio resource control, or a physical downlink shared channel resource element mapping and a quasi co-location indicator in a downlink control indication. Therefore, in this embodiment of the present invention, the base station may notify each terminal of a QCL message in a plurality of implementations.

In an optional implementation, the at least one piece of QCL indication information is corresponding to at least one code word. Therefore, the method provided in this embodiment of the present invention can be better applied to coordinated multipoint data transmission/reception.

In an optional implementation, the method further includes: sending, by the base station, the QCL indication information to another base station, so that the another base station can learn of specific content of the QCL indication information.

According to a second aspect, an embodiment of the present invention provides a method for indicating quasi co-location indication information, including: receiving, by a terminal, QCL indication information sent by a base station; and determining, based on the QCL indication information, reference signals on which QCL assumption is performed and that are corresponding to at least two antenna ports. Therefore, according to the method provided in this embodiment of the present invention, the terminal can determine, based on the received QCL indication information, the reference signals on which QCL assumption is performed, and further determine a same large-scale characteristic of the reference signals. QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources.

In an optional implementation, the QCL information includes information about the at least two antenna ports. Therefore, the method provided in this embodiment of the present invention can support QCL assumption performed on reference signals corresponding to two or more antenna ports, thereby broadening a QCL range.

In an optional implementation, the QCL information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an average AOA, an AOA spread, an average AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

It should be understood that the same parameter herein may be predefined or dynamically adjusted.

In an optional implementation, same parameters of the reference signals corresponding to the at least two antenna ports have different reference signal types; same parameters of the reference signals corresponding to the at least two antenna ports have a same reference signal type and different reference signal patterns; or same parameters of the reference signals corresponding to the at least two antenna ports have a same reference signal type and a same reference signal pattern. The reference signal pattern is a time-frequency location of a resource element at which a reference signal at a preset time-frequency resource granularity is located, and types of the reference signal include a demodulation reference signal, a channel state information reference signal, and a beam reference signal. Therefore, in this embodiment of the present invention, there are various combinations of types and patterns of reference signals, thereby enriching types of the reference signals.

In an optional implementation, the reference signals corresponding to the at least two antenna ports include a reference signal used for phase noise and/or frequency shift estimation. Therefore, in this embodiment of the present invention, QCL assumption can be performed on the reference signal used for phase noise and/or frequency shift estimation and another signal. In addition, the reference signal used for phase noise and/or frequency shift estimation may be different from the another signal in types and patterns. The terminal may determine, based on a reference signal that participates in QCL assumption with the reference signal used for phase noise and/or frequency shift estimation, a large-scale characteristic of the reference signal used for phase noise and/or frequency shift estimation, and further estimate phase noise and/or a frequency shift.

In an optional implementation, the receiving, by a terminal, QCL information sent by a base station includes: receiving, by the terminal, the QCL information sent by the base station by using signaling, where the signaling is a semi-static indication or a dynamic indication, and the signaling is at least one of a downlink control indication, radio resource control, or a physical downlink shared channel resource element mapping and a quasi co-location indicator in a downlink control indication. In this embodiment of the present invention, the base station may notify each terminal of a QCL message in a plurality of implementations.

According to a third aspect, an embodiment of the present invention provides a base station, including a transceiver; a memory, configured to store an instruction; and a processor, connected to both the transceiver and the memory, and configured to perform the following operations according to the instruction stored in the memory: generating reference signal configuration information, where each piece of reference signal configuration information is corresponding to one reference signal, and each reference signal is corresponding to at least one antenna port; performing, based on the reference signal configuration information, quasi co-location QCL assumption on reference signals corresponding to at least two antenna ports in the reference signals, to generate QCL indication information; and sending the QCL indication information to a terminal by using the transceiver. QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources.

In an optional implementation, the QCL indication information includes information about the at least two antenna ports.

In an optional implementation, the QCL indication information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an angle of arrival AOA, an average AOA, an AOA spread, an angle of departure AOD, an average angle of departure AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

In an optional implementation, each piece of reference signal configuration information includes at least one of an antenna port corresponding to a reference signal, a time domain resource occupied by a reference signal, a frequency domain resource occupied by a reference signal, a scrambling identity of a reference signal, and a carrier index of a reference signal.

In an optional implementation, the reference signals corresponding to the at least two antenna ports have different reference signal types; the reference signals corresponding to the at least two antenna ports have a same reference signal type and different reference signal patterns; or the reference signals corresponding to the at least two antenna ports have a same reference signal type and a same reference signal pattern. The reference signal pattern is a time-frequency location of a resource element at which a reference signal at a preset time-frequency resource granularity is located, and types of the reference signal include a demodulation reference signal, a channel state information reference signal, and a beam reference signal.

In an optional implementation, the reference signals corresponding to the at least two antenna ports include a reference signal used for phase noise and/or frequency shift estimation.

In an optional implementation, the processor is specifically configured to: when sending the QCL indication information to the terminal, send the QCL indication information to the terminal by using signaling, where the signaling is a semi-static indication or a dynamic indication, and the signaling is at least one of a downlink control indication, radio resource control, or a physical downlink shared channel resource element mapping and a quasi co-location indicator in a downlink control indication.

In an optional implementation, the at least one piece of QCL indication information is corresponding to at least one code word.

In an optional implementation, the processor is further configured to send the QCL indication information to another base station.

According to a fourth aspect, a terminal is provided, including a transceiver; a memory, configured to store an instruction; and a processor, connected to both the transceiver and the memory, and configured to perform the following operations according to the instruction stored in the memory: receiving, by using the transceiver, QCL indication information sent by a base station; and determining, based on the QCL indication information, reference signals on which QCL assumption is performed and that are corresponding to at least two antenna ports. In an optional implementation, the QCL information includes information about the at least two antenna ports. QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources.

In an optional implementation, the QCL information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an average AOA, an AOA spread, an average AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

In an optional implementation, same parameters of the reference signals corresponding to the at least two antenna ports have different reference signal types; same parameters of the reference signals corresponding to the at least two antenna ports have a same reference signal type and different reference signal patterns; or same parameters of the reference signals corresponding to the at least two antenna ports have a same reference signal type and a same reference signal pattern. The reference signal pattern is a time-frequency location of a resource element at which a reference signal at a preset time-frequency resource granularity is located, and types of the reference signal include a demodulation reference signal, a channel state information reference signal, and a beam reference signal.

In an optional implementation, the reference signals corresponding to the at least two antenna ports include a reference signal used for phase noise and/or frequency shift estimation.

In an optional implementation, the processor is specifically configured to: when receiving the QCL information sent by the base station, receive the QCL information sent by the base station by using signaling, where the signaling is a semi-static indication or a dynamic indication, and the signaling is at least one of a downlink control indication, radio resource control, or a physical downlink shared channel resource element mapping and a quasi co-location indicator in a downlink control indication.

In addition, an embodiment of the present invention further provides a method for determining a quantity of antenna ports corresponding to a phase noise compensation reference signal. The method includes: indicating, by a base station, information that antenna ports use a same local oscillator, through predefining, by using higher layer signaling, or by using downlink control information; indicating, by the base station, QCL information of each antenna port by using QCL indication information; and performing, by the base station, grouping based on the information that antenna ports use a same local oscillator and the QCL information, to determine a quantity of antenna ports corresponding to a reference signal used for phase noise and/or frequency shift estimation. Therefore, antenna ports that are quasi co-located and use a same local oscillator are classified into one group by using the foregoing method, thereby reducing complexity of parsing a reference signal by a terminal.

An embodiment of the present invention further provides a time-domain density configuration method of a phase noise compensation reference signal. In a system supporting a plurality of parameters, a mapping relationship between a subcarrier spacing and a time-domain density configuration of a reference signal used for phase noise and/or frequency shift estimation is predefined. A base station determines, based on the subcarrier spacing, a time-domain density configuration of the reference signal used for phase noise and/or frequency shift estimation, and a terminal may periodically or aperiodically report, based on an estimated frequency shift value, a recommended time-domain density configuration of the reference signal. The base station may notify the terminal of the time-domain density configuration, used by the base station, of the reference signal. Therefore, according to the foregoing method, the base station may determine, based on the subcarrier spacing and a feedback of the terminal, the time-domain density configuration (namely, a time-domain configuration of the phase noise compensation reference signal) of the reference signal used for phase noise and/or frequency shift estimation, to satisfy requirements of actual cases of various different scenarios.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

Figure 1:
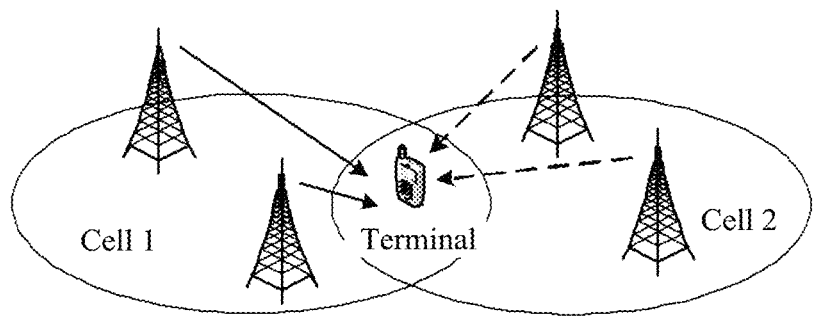
FIG. 1 is a schematic diagram of a scenario of coordinated multi-antenna point transmission/reception according to an embodiment of the present invention.

The embodiments of the present invention may be used in a Long Term Evolution (LTE) system, an evolved system of the LTE, and the like. Application scenarios of the embodiments of the present invention include but are not limited to coordinated multipoint transmission/reception (COMP) and a distributed multi-antenna system combining an existing multiple input multiple output (MIMO) technology (including a diversity technology for improving transmission reliability and a multi-stream technology for increasing a data transmission rate) and CoMP. FIG. 1 is a schematic diagram of a scenario of coordinated multi-antenna point transmission/reception. It should be understood that the embodiments of the present invention are applicable to both a homogeneous network scenario and a heterogeneous network scenario. In addition, no limitation is imposed on transmission points. CoMP may be performed between a macro base station and a macro base station, a micro base station and a micro base station, and a macro base station and a micro base station, and the embodiments of the present invention are also applicable to a frequency division duplex (FDD) system or a time division duplex (TDD) system.

In a radio communications system, none of frequency processing components such as a local oscillator, a frequency divider, and an up- and down-frequency converter is an ideal component. Therefore, carrier signals output by these components are not pure, and may carry phase noise and cause an inherent frequency shift. Specifically, there is a direct relationship between phase noise power and a carrier frequency. The relationship is that the phase noise power changes with 20 log(n), where n is an increased multiple of the carrier frequency. The relationship indicates that each time the carrier frequency is increased by one multiple, the phase noise power is increased by 6 dB. For the frequency shift, in addition to the inherent frequency shift caused by different used oscillators, a Doppler frequency shift is caused by relative movement between a terminal and a base station. The Doppler frequency shift is also related to the carrier frequency. When there is a same relative movement speed, a higher carrier frequency indicates a larger Doppler frequency shift.

Therefore, both phase noise impact and frequency shift impact in a high-frequency high-modulation application scenario cannot be ignored. In a future evolved radio system of the 3rd Generation Partnership Project (3GPP), for example, high frequencies have been included in a range of adopted frequency spectrum in a new radio (NR) technology. Therefore, the problems of the phase noise and the frequency shift need to be resolved in a system design.

Currently, a commonly used solution in the industry is that a reference signal used for phase noise and/or frequency shift estimation is included in a system. However, in the prior art, there is a relatively small amount of configuration information of the reference signal used for phase noise and/or frequency shift estimation, and there is a relatively few types of reference signals and a relatively small amount of reference signal configuration information that are indicated by QCL. Consequently, it is difficult to satisfy requirements of a plurality of scenarios in NR.

Phase noise changes randomly in time domain, and a reference signal used for phase noise estimation usually requires relatively high time domain density; and phase rotation caused by a frequency shift changes linearly in time domain, and a reference signal used for frequency shift estimation has a lower time domain density requirement than the reference signal used for phase noise estimation. Therefore, the reference signal used for phase noise estimation may be used to correct a frequency shift. However, during lower-order modulation, phase noise impact is so small that the impact does not need to be estimated. In this case, a low time-domain density reference signal may be configured for frequency shift estimation, to reduce overheads of reference signals. In addition, for different antenna ports, if antenna ports use a same local oscillator, the two antenna ports have same phase noise. If antenna ports not only use a same local oscillator, but also are QCL-ed, the antenna ports have a same frequency shift. Therefore, a frequency shift and phase noise on the antenna ports can be estimated by sending a reference signal only on a few antenna ports.

If the reference signal used for phase noise and/or frequency shift estimation cannot be dynamically configured, to accurately estimate phase noise and a frequency shift, the reference signal used for phase noise and/or frequency shift estimation always needs to be sent with a highest requirement configuration, that is, a high time-domain density reference signal used for phase noise and/or frequency shift estimation is sent on each antenna port. However, such a configuration manner causes large overheads. Therefore, different quantities of transmit antenna ports and different time domain intervals may be configured for a reference signal used for phase noise and/or frequency shift estimation in different scenarios, so as to reduce overheads of reference signals.

Further, in a multi-antenna LTE system, to distinguish between different channels, different antenna ports and reference signals are defined. For example, a cell-level reference signal is distributed on antenna ports 0 to 3; a multimedia broadcast multicast service single frequency network (MBSFN) reference signal is distributed on an antenna port 4; a user-level reference signal is distributed on an antenna port 5 or antenna ports 7 to 14 or antenna ports 107 to 110; and a channel state indication reference signal is distributed on antenna ports 15 to 22. The reference signal used for phase noise and/or frequency shift estimation in the embodiments includes but is not limited to a demodulation pilot, a beam pilot, a synchronization pilot, a channel state indication pilot, a phase noise compensation pilot, and the like. In other words, the reference signal may be an existing pilot, a part of an existing pilot, or a newly added pilot.

Existing control information does not include information indicating a relationship between reference signals that are used for phase noise and frequency shift estimation and that are corresponding to antenna ports, and indicating a relationship between another reference signal and a reference signal that is used for phase noise and/or frequency shift estimation. For example, the information indicates whether the antenna ports are quasi co-located or use a same local oscillator. In the embodiments of the present invention, configuration information of a reference signal, a method for indicating QCL indication information, and a configuration of a reference signal used for phase noise and/or frequency shift estimation in a radio communications system are mainly discussed.

In the embodiments of the present invention, the reference signal used for phase noise and/or frequency shift estimation may be referred to as a phase noise compensation reference signal.

The following describes the preferred implementations of the present invention in detail with reference to the accompanying drawings.

Figure 2:
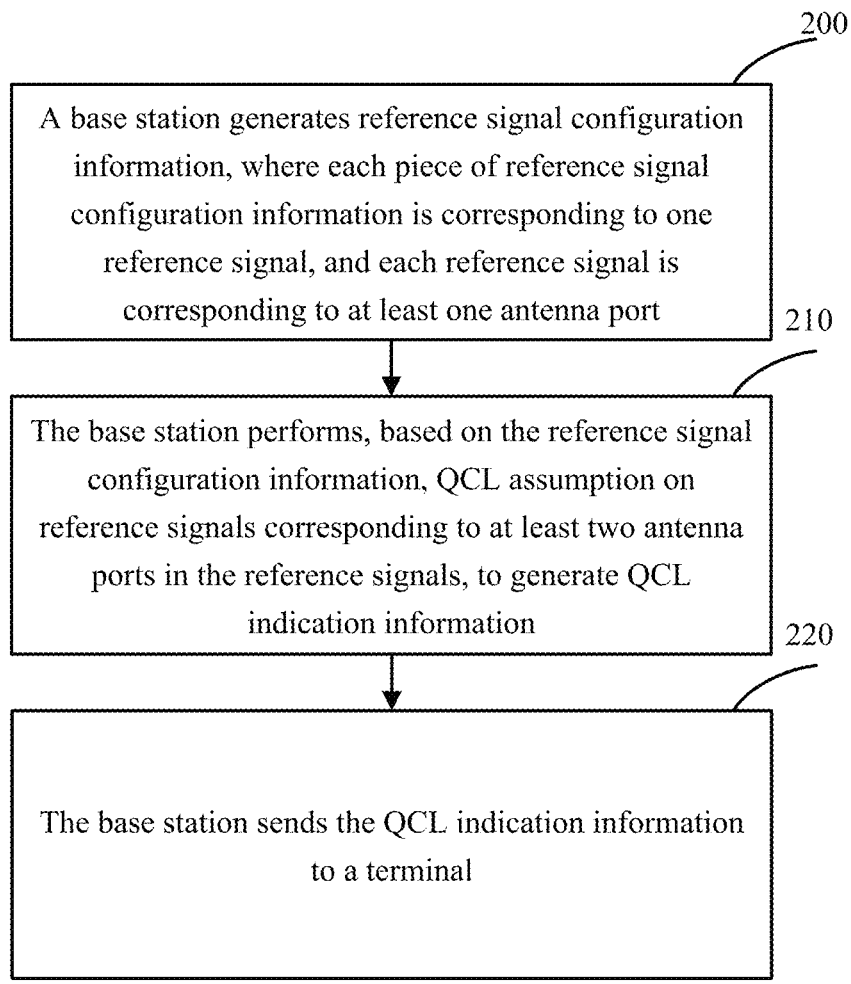
FIG. 2 is a first overview flowchart of a method for indicating quasi co-location indication information according to an embodiment of the present invention.

Referring to FIG. 2, an embodiment of the present invention provides a method for indicating quasi co-location indication information. The method includes the following steps.

Step 200: A base station generates reference signal configuration information, where each piece of reference signal configuration information is corresponding to one reference signal, and each reference signal is corresponding to at least one antenna port.

Step 210: The base station performs, based on the reference signal configuration information, QCL assumption on reference signals corresponding to at least two antenna ports in the reference signals, to generate QCL indication information.

QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources.

Step 220: The base station sends the QCL indication information to a terminal.

Optionally, the QCL indication information includes information about the at least two antenna ports.

Optionally, the QCL indication information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an angle of arrival (AOA), an average AOA, an AOA spread, an angle of departure (AOD), an average AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

It should be understood that the same parameter herein may be predefined. For example, if an antenna port corresponding to a phase noise compensation reference signal and an antenna port corresponding to a demodulation reference signal are QCL-ed, a same parameter of two antenna ports may be a set {delay spread, Doppler spread, Doppler frequency shift, average AOA/AOD, AOA/AOD spread, correlation parameter of receive antenna space, beam parameter specific to a transmit beam, beam parameter specific to a receive beam, resource identifier}. The information about the at least two antenna ports in the QCL indication information may represent that QCL assumption is performed on an antenna port x corresponding to a phase noise compensation reference signal and antenna ports 7 and 8 corresponding to a demodulation reference signal, or that QCL assumption is performed on an antenna port y corresponding to a phase noise compensation reference signal and antenna ports 9 and 10 corresponding to a demodulation reference signal, or that QCL assumption is performed on antenna ports x and y corresponding to a phase noise compensation reference signal, or that QCL assumption is performed on antenna ports 7 and 8 corresponding to a demodulation reference signal, or that QCL assumption is performed on an antenna port 7 and an antenna port 7 that perform data transmission/reception at different time, and/or at different frequencies, and/or on different code domain resources.

For step 200, optionally, each piece of reference signal configuration information includes at least one of an antenna port corresponding to a reference signal, a time domain resource occupied by a reference signal, a frequency domain resource occupied by a reference signal, a scrambling identity of a reference signal, and a carrier index of a reference signal. The reference signal configuration information may be sent to the terminal or may not be sent to the terminal.

For example, the base station side configures configuration information of a phase noise compensation reference signal and configuration information of a demodulation reference signal (DMRS). The configuration information includes at least one of an antenna port corresponding to a reference signal, a time domain resource occupied by a reference signal, a frequency domain resource occupied by a reference signal, a scrambling identity of a reference signal, or a carrier index of a reference signal.

For another example, when the configuration information includes the antenna port corresponding to the reference signal, for example, the DMRS is corresponding to antenna ports 7 to 14, and a channel state information reference signal is corresponding to antenna ports 15 to 22.

Optionally, an antenna port corresponding to a first reference signal pattern may be a subset of antenna ports corresponding to a second reference signal pattern. For example, the antenna ports corresponding to the first reference signal pattern include antenna ports m0, m0+1, . . . , and m0+n, and the antenna ports corresponding to the second reference signal pattern include an antenna port m0, where n is an integer greater than or equal to 1, and m0 is an integer.

Optionally, quantities of antenna ports corresponding to reference signals may be the same or different. For example, antenna ports corresponding to a demodulation reference signal are antenna ports m0, m0+1, . . . , and m0+n, and an antenna port corresponding to a phase noise compensation reference signal is an antenna port p0, where m0 is an integer, p0 is an integer, and m0 is not equal to p0. The time domain resource and the frequency domain resource of the reference signal are a time domain location and a frequency domain location of the reference signal in bandwidth.

The scrambling identity of the reference signal is a reference signal pilot sequence used to distinguish between different users, to distinguish transmission of different users on a same resource.

The carrier index means that: A system with a plurality of parameters may be introduced in NR due to diversity of service requirements and diversity of scenarios, where the plurality of parameters include a subcarrier spacing. In this case, different reference signals may be transmitted on different subcarriers, and a subcarrier index is required.

Optionally, the reference signals corresponding to the at least two antenna ports have different reference signal types;

the reference signals corresponding to the at least two antenna ports have a same reference signal type and different reference signal patterns; or the reference signals corresponding to the at least two antenna ports have a same reference signal type and a same reference signal pattern, where the reference signal pattern is a time-frequency location of a resource element at which a reference signal at a preset time-frequency resource granularity is located, and types of the reference signal include a demodulation reference signal, a channel state information reference signal, and a beam reference signal.

Optionally, the reference signals corresponding to the at least two antenna ports include a reference signal used for phase noise and/or frequency shift estimation.

For example, types of the phase noise compensation reference signal may be a demodulation reference signal, a channel state information reference signal, a beam reference signal, or a newly defined reference signal. A function of the phase noise compensation reference signal is used for phase noise and/or frequency shift estimation. A pattern of the phase noise compensation reference signal may be the same as or different from a pattern of an existing reference signal. A quantity of antenna ports corresponding to the phase noise compensation reference signal may be the same as or different from a quantity of antenna ports corresponding to the existing reference signal. An antenna port number corresponding to the phase noise compensation reference signal may be the same as or different from an antenna port number corresponding to the existing reference signal. A reference signal pattern (pattern) herein is a time-frequency location of a resource element at which a reference signal at a specific time-frequency resource granularity is located.

For another example, there may be a plurality of patterns for the phase noise compensation reference signal, so as to be applicable to complex and changeable services and scenarios in NR. For example, when a user is in a high-frequency high-speed scenario, to ensure accuracy of phase noise estimation, a phase noise compensation reference signal has higher time domain density than a phase noise compensation reference signal in a high-frequency low-speed scenario. If a type of the phase noise compensation reference signal is the same as that of an existing reference signal, the phase noise compensation reference signal and the existing reference signal may have different reference signal patterns. For example, when a user is in a high-frequency high-speed scenario, the phase noise compensation reference signal and the existing reference signal have different time-domain density and different frequency-domain density. For another example, when a user is in a high-frequency high-speed scenario, the phase noise compensation reference signal and the existing reference signal may have same time-domain density and different frequency-domain density.

For step 220, optionally, when the base station sends the QCL indication information to the terminal, the base station sends the QCL indication information to the terminal by using signaling, where the signaling is a semi-static indication or a dynamic indication.

For example, when there is a relatively good channel condition, phase noise is relatively stable, the semi-static indication is used to send reference signal configuration information specific to the phase noise compensation reference signal, and send QCL indication information used to indicate a relationship between antenna ports corresponding to a phase noise compensation reference signal and/or a relationship between an antenna port corresponding to a phase noise compensation reference signal and an antenna port corresponding to another reference signal. Therefore, this can reduce signaling overheads of reference signals.

The signaling is at least one of a downlink control indication, radio resource control, or a physical downlink shared channel resource element mapping and a quasi co-location indicator in a downlink control indication.

For example, the signaling is a downlink control indication, used to indicate a QCL assumption relationship between antenna ports corresponding to reference signals to the terminal. The signaling includes information about antenna ports on which QCL assumption is performed, and may further include a parameter set of same parameters in QCL assumption. The parameter set includes at least one of a delay spread, a Doppler spread, a Doppler frequency shift, an average delay, an average gain, an AOA, an average AOA, an AOA spread, an AOD, an average AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

Optionally, at least one piece of QCL indication information is corresponding to at least one code word.

During coordinated multipoint transmission/reception of data, there is usually more than one transport layer in total, and the data is usually corresponding to one or more code words. A mapping relationship between a code word and a transmission point may be at least one of the following: each code word is corresponding to one point; each code word is corresponding to a plurality of points; or a plurality of code words are corresponding to one point. This is not limited herein. In a specific implementation process, one point is corresponding to at least one piece of QCL indication information, one piece of QCL indication information may be corresponding to one code word, one QCL indication may be corresponding to two code words, and a plurality of pieces of QCL indication information may be corresponding to a plurality of code words.

Optionally, the base station sends the QCL indication information to another base station.

Figure 3:
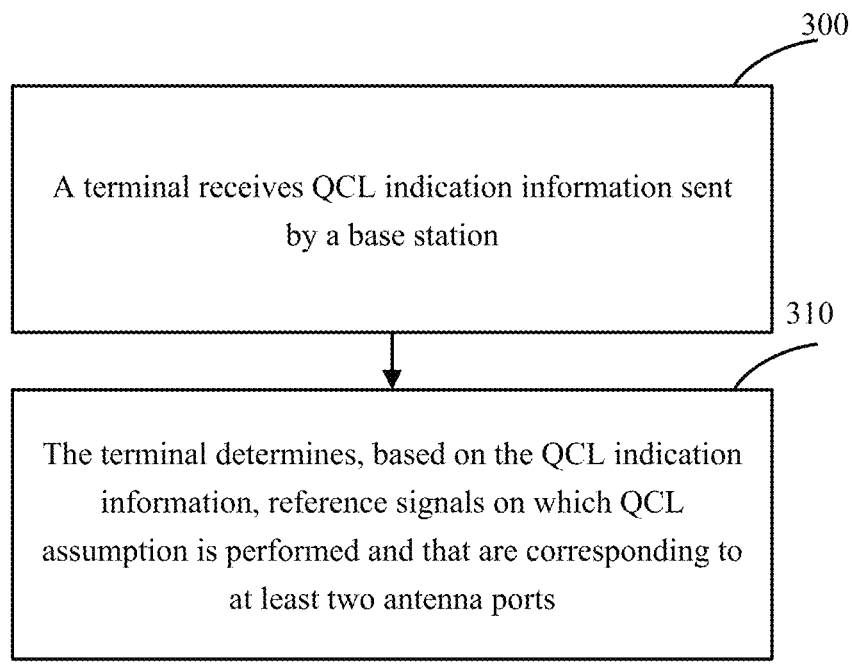
FIG. 3 is a second overview flowchart of a method for indicating quasi co-location indication information according to an embodiment of the present invention.

Referring to FIG. 3, an embodiment of the present invention provides a method for indicating quasi co-location indication information. The method includes the following steps.

Step 300: A terminal receives QCL indication information sent by a base station.

Step 310: The terminal determines, based on the QCL indication information, reference signals on which QCL assumption is performed and that are corresponding to at least two antenna ports.

Optionally, the QCL information includes information about the at least two antenna ports. QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources.

Optionally, the QCL information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an average AOA, an AOA spread, an average AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

Optionally, same parameters of the reference signals corresponding to the at least two antenna ports have different reference signal types;

same parameters of the reference signals corresponding to the at least two antenna ports have a same reference signal type and different reference signal patterns; or same parameters of the reference signals corresponding to the at least two antenna ports have a same reference signal type and a same reference signal pattern, where the reference signal pattern is a time-frequency location of a resource element at which a reference signal at a preset time-frequency resource granularity is located, and types of the reference signal include a demodulation reference signal, a channel state information reference signal, and a beam reference signal.

Optionally, the reference signals corresponding to the at least two antenna ports include a reference signal used for phase noise and/or frequency shift estimation.

When performing step 310, the terminal receives the QCL information sent by the base station by using signaling, where the signaling is a semi-static indication or a dynamic indication, and the signaling is at least one of a downlink control indication, radio resource control, or a physical downlink shared channel resource element mapping and a quasi co-location indicator in a downlink control indication.

An embodiment of the present invention provides a method for determining a quantity of antenna ports corresponding to a phase noise compensation reference signal. An applicable scenario of the method includes but is not limited to CoMP.

For ease of description, it is assumed that during downlink transmission of a terminal, a total of P antenna ports send data, and antenna port numbers are denoted as Port$\{n_0, n_1, \ldots, n_p, \ldots n_{P-1}\}$. The P antenna ports may not necessarily use a same local oscillator. It is assumed that the P antenna ports are corresponding to M local oscillators. For example, the M local oscillators are from M base stations or M transmission receive points (TRP).

The base station indicates, by using higher layer signaling or control information, whether the antenna ports use a same local oscillator.

The base station indicates QCL information corresponding to the antenna ports.

Among the P antenna ports, if L antenna ports use a same local oscillator, and any two of the L antenna ports are QCL-ed, the L antenna ports are classified into one group.

P antenna ports used to send data to a terminal are grouped according to the foregoing rule. To be specific, antenna ports in each group use a same local oscillator and any two of the antenna ports are QCL-ed; and if there is no another antenna port that uses a same local oscillator with an antenna port and that is OCL-ed with the antenna port, the antenna port is separately classified into one group.

A quantity of corresponding antenna ports used to send a phase noise compensation reference signal is the same as a quantity of groups obtained through grouping according to the foregoing rule. If the P antenna ports are classified into N groups according to the foregoing rule, the quantity of corresponding antenna ports used to send a phase noise compensation reference signal is also N.

For further specific description, for example, six antenna ports are used to send data in this embodiment. To be specific, it is assumed that there are six antenna ports used to send data to a terminal, that is, P=6, antenna port numbers are denoted as antenna ports Port$\{n_0, n_1, n_2, n_3, n_4, n_5\}$.

It is assumed that the six antenna ports are antenna ports of two base stations, and are corresponding to two local oscillators: an oscillator A and an oscillator B. The antenna ports $n_0, n_1, n_2, n_3, n_4$ are corresponding to the oscillator A, the antenna port $n_5$ is corresponding to the oscillator B, antenna ports $n_0, n_1$ are QCL-ed, and antenna ports $n_2, n_3$ are QCL-ed.

The base station indicates, by using higher layer signaling or control information, that the antenna ports $n_0$, $n_1$, $n_2$, $n_3$, $n_4$ use a same local oscillator, and $n_5$ is corresponding to another local oscillator. In addition, the base station also provides quasi co-location information that the antenna ports $n_0$, $n_1$ are QCL-ed and the antenna ports $n_2$, $n_3$ are QCL-ed. The six antenna ports may be classified into four groups according to the foregoing solution: group1$\{n_0, n_1\}$, group2$\{n_2, n_3\}$, group3$\{n_4\}$, and group4$\{n_5\}$, and N is 4. Therefore, it may be determined that there are four antenna ports used to send a phase noise compensation reference signal.

An embodiment of the present invention further provides a time-domain density configuration method of a phase noise compensation reference signal. An applicable scenario of the method includes but is not limited to a system with a plurality of parameters. The plurality of parameters include a plurality of subcarrier spacings, cyclic prefix (CP) lengths, and frequencies. A base station determines, based on a modulation order for sending data, the subcarrier spacing, or a configuration reported by a terminal, a time-domain density configuration for sending a phase noise compensation reference signal. It is assumed that the phase noise compensation reference signal is sent at an interval of Δl symbols in time domain, and if phase noise compensation reference signals are continuously sent in all symbols, Δl=0.

When phase noise estimation is required, a phase noise compensation reference signal with high time-domain density is configured. In other words, Δl is a relatively small value, and in this case, the phase noise compensation reference signal is used for both phase noise and frequency shift estimation.

When phase noise estimation is not required, a phase noise compensation reference signal with relatively low time-domain density is configured. If a system with a plurality of parameters is supported, a relationship between a subcarrier spacing and a phase noise compensation reference signal mapping method is defined. The base station determines the phase noise compensation reference signal mapping method based on the subcarrier spacing, and the terminal determines a receive location of the phase noise compensation reference signal based on the subcarrier spacing. The phase noise compensation reference signal is used only for frequency shift estimation.

For further description, it is assumed that two subcarrier spacings are supported: $f_{sc}$=75 kHz and $f_{sc}$=60 kHz, and a mapping relationship between a subcarrier spacing and a phase noise compensation reference signal is defined as follows:

$f_{sc}$=75 kHz, and Δl=5; and $f_{sc}$=60 kHz, and Δl=4, where when the subcarrier spacing $f_{sc}$ is 75 kHz, the base station sends a phase noise compensation reference signal at an interval of five symbols, and the terminal receives a phase noise compensation reference signal at an interval of five symbols; and when the subcarrier spacing $f_{sc}$ is 60 kHz, the base station sends a phase noise compensation reference signal at an interval of four symbols, and the terminal receives a phase noise compensation reference signal at an interval of four symbols.

The terminal may further report a recommended time-domain density configuration Δl of a phase noise compensation reference signal based on an estimated frequency shift value. Herein, a reporting period may be fixed or not fixed.

The base station may notify, by using signaling, the terminal of a phase noise compensation reference signal configuration used by the base station, where the signaling may be RRC signaling or downlink control signaling.

Figure 4:
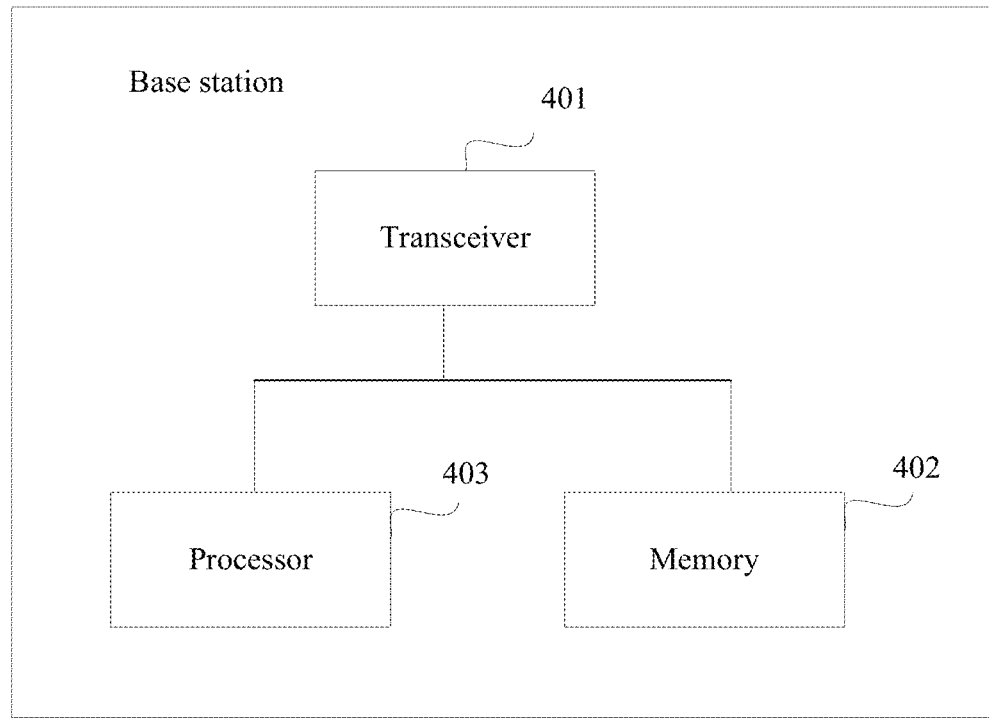
FIG. 4 is a schematic structural diagram of a base station according to an embodiment of the present invention.

Referring to FIG. 4, an embodiment of the present invention provides a base station, including:

a transceiver 401;

a memory 402, configured to store an instruction; and a processor 403, connected to both the transceiver 401 and the memory 402, and configured to perform the following operations according to the instruction stored in the memory 402: generating reference signal configuration information, where each piece of reference signal configuration information is corresponding to one reference signal, and each reference signal is corresponding to at least one antenna port; performing, based on the reference signal configuration information, quasi co-location QCL assumption on reference signals corresponding to at least two antenna ports in the reference signals, to generate QCL indication information; and sending the QCL indication information to a terminal by using the transceiver 401.

In an optional implementation, the QCL indication information includes information about the at least two antenna ports. QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources.

In an optional implementation, the QCL indication information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an angle of arrival AOA, an average AOA, an AOA spread, an angle of departure AOD, an average angle of departure AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

In an optional implementation, each piece of reference signal configuration information includes at least one of an antenna port corresponding to a reference signal, a time domain resource occupied by a reference signal, a frequency domain resource occupied by a reference signal, a scrambling identity of a reference signal, and a carrier index of a reference signal.

In an optional implementation, the reference signals corresponding to the at least two antenna ports have different reference signal types; the reference signals corresponding to the at least two antenna ports have a same reference signal type and different reference signal patterns; or the reference signals corresponding to the at least two antenna ports have a same reference signal type and a same reference signal pattern. The reference signal pattern is a time-frequency location of a resource element at which a reference signal at a preset time-frequency resource granularity is located, and types of the reference signal include a demodulation reference signal, a channel state information reference signal, and a beam reference signal.

In an optional implementation, the reference signals corresponding to the at least two antenna ports include a reference signal used for phase noise and/or frequency shift estimation.

In an optional implementation, the processor 403 is specifically configured to: when sending the QCL indication information to the terminal, send the QCL indication information to the terminal by using signaling, where the signaling is a semi-static indication or a dynamic indication, and the signaling is at least one of a downlink control indication, radio resource control, or a physical downlink shared channel resource element mapping and a quasi co-location indicator in a downlink control indication.

In an optional implementation, the at least one piece of QCL indication information is corresponding to at least one code word.

In an optional implementation, the processor 403 is further configured to send the QCL indication information to another base station.

Figure 5:
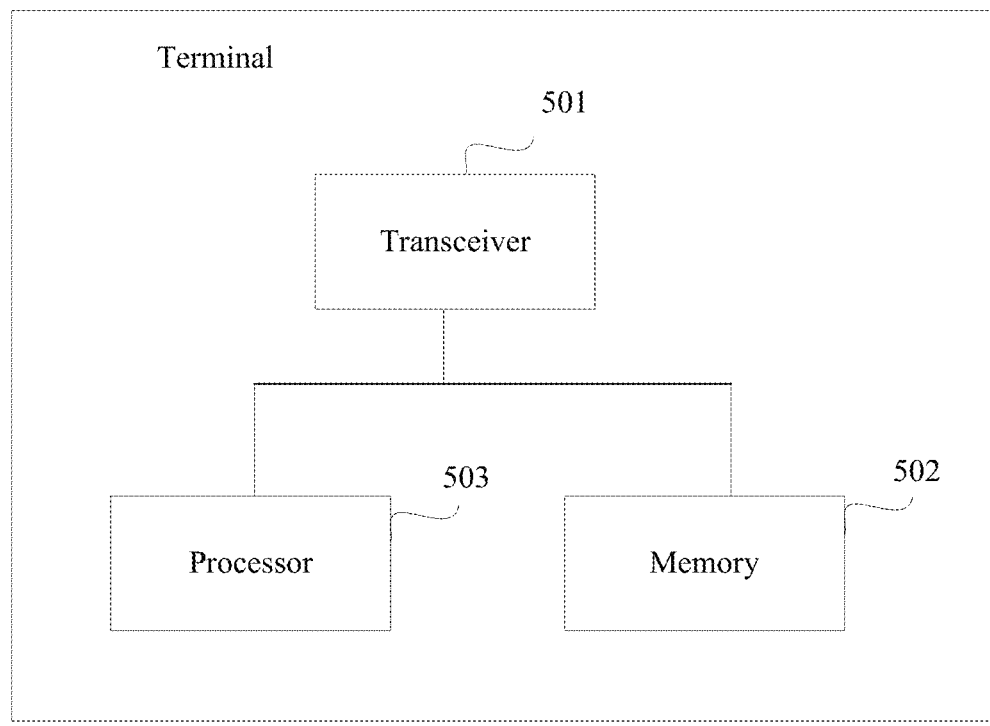
FIG. 5 is a schematic structural diagram of a terminal according to an embodiment of the present invention.

Referring to FIG. 5, an embodiment of the present invention provides a terminal, including:

a transceiver 501;

a memory 502, configured to store an instruction; and a processor 503, connected to both the transceiver 501 and the memory 502, and configured to perform the following operations according to the instruction stored in the memory:

receiving, by using the transceiver 501, QCL indication information sent by a base station; and determining, based on the QCL indication information, reference signals on which QCL assumption is performed and that are corresponding to at least two antenna ports.

In an optional implementation, the QCL information includes information about the at least two antenna ports. QCL is a relationship between ports. The at least two ports include at least one of the following cases: at least two ports with a same port number, namely, antenna ports, with a same antenna number, on which QCL assumption is performed; antennas ports with different antenna port numbers; or antenna ports that have a same antenna port number and that send/receive information at different time, and/or at different frequencies, and/or on different code domain resources; or antenna ports that have different antenna port numbers and that send/receive information at different time, and/or at different frequencies, and/or on different code domain resources.

In an optional implementation, the QCL information further includes a same parameter of the reference signals corresponding to the at least two antenna ports, and/or a parameter association relationship between the at least two antenna ports. For example, a parameter of one antenna port may be deduced by using a parameter of another antenna port, or a difference between a parameter of one antenna port and a parameter of another antenna port is less than a threshold. The parameter is at least one of a delay spread, a Doppler spread, a Doppler frequency shift, an average delay, an average gain, an average AOA, an AOA spread, an average AOD, an AOD spread, a correlation parameter of receive antenna space, a beam parameter specific to a transmit beam, a beam parameter specific to a receive beam, and a resource identifier.

The AOA, the average AOA, the AOA spread, the AOD, the average AOD, and the AOD spread are decomposition values at different dimensions or a combination of decomposition values at different dimensions. The beam parameter includes at least one of the following: a precoding matrix, a weight sequence number, and a beam sequence number. The resource identifier includes a CSI-RS resource identifier or an SRS resource identifier, and is used to indicate a beam on a resource. The CSI-RS resource identifier is used to indicate a transmit beam used for sending a CSI-RS on a corresponding time-frequency resource, and/or a receive beam used for receiving a CSI-RS on a corresponding time-frequency resource. The SRS resource identifier is used to indicate a transmit beam used for sending an SRS on a corresponding time-frequency resource, and/or a receive beam used for receiving an SRS on a corresponding time-frequency resource.

In an optional implementation, same parameters of the reference signals corresponding to the at least two antenna ports have different reference signal types; same parameters of the reference signals corresponding to the at least two antenna ports have a same reference signal type and different reference signal patterns; or same parameters of the reference signals corresponding to the at least two antenna ports have a same reference signal type and a same reference signal pattern. The reference signal pattern is a time-frequency location of a resource element at which a reference signal at a preset time-frequency resource granularity is located, and types of the reference signal include a demodulation reference signal, a channel state information reference signal, and a beam reference signal.

In an optional implementation, the reference signals corresponding to the at least two antenna ports include a reference signal used for phase noise and/or frequency shift estimation.

In an optional implementation, the processor 503 is specifically configured to: when receiving the QCL information sent by the base station, receive the QCL information sent by the base station by using signaling, where the signaling is a semi-static indication or a dynamic indication, and the signaling is at least one of a downlink control indication, radio resource control, or a physical downlink shared channel resource element mapping and a quasi co-location indicator in a downlink control indication.

Therefore, according to the method provided in the embodiments of the present invention, based on diversity of the reference signal configuration information, QCL assumption can be performed on a plurality types of reference signals, to generate QCI indication information, thereby satisfying requirements of a plurality of scenarios in NR. In the embodiments of the present invention, QCI assumption can be performed on the reference signal used for phase noise and/or frequency shift estimation and another signal. In addition, the reference signal used for phase noise and/or frequency shift estimation may be different from the another signal in types and patterns, and configuration information of the reference signal used for phase noise and/or frequency shift estimation is generated in various manners. The terminal may determine, based on a reference signal that participates in QCL assumption with the reference signal used for phase noise and/or frequency shift estimation, a large-scale characteristic of the reference signal used for phase noise and/or frequency shift estimation, and further estimate phase noise and/or a frequency shift.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specified function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies of the present invention.

What is claimed is:

1. A method for indicating quasi co-location (QCL) indication information so as to reduce signaling overheads of reference signals, the method comprising:
  receiving, by a terminal, the QCL indication information sent by a base station having at least two antenna ports, wherein each antenna port has at least one reference signal,
    wherein the QCL indication information includes information about parameters shared between or among reference signals associated with the at least two antenna ports,
    wherein the QCL indication information includes pattern and type information for each parameter,
    wherein the pattern information includes time-frequency locations of resource elements for the reference signals,
    wherein the type information includes information about types of the reference signals, wherein the types include a demodulation reference signal, a channel state information reference signal and a beam reference signal, and
    wherein the QCL indication information for each parameter shared between or among the reference signals associated with the at least two antenna ports indicated whether the reference signals associated with the shared parameter have (i) different reference signal types, (ii) a same reference signal type and different reference signal patterns or (iii) a same reference signal type and a same reference signal pattern; and
  determining, by the terminal based on the QCL indication information, reference signals on which QCL assumption is performed and that are associated with the at least two antenna ports.

2. The method according to claim 1, wherein the at least two antenna ports are either one of the following groups (a) and (b):
  (a) antenna ports with different antenna port numbers, or
  (b) antenna ports that have a same antenna port number and that send/receive information (i) at different time, (ii) at different frequencies, and/or (iii) on different code domain resources.

3. The method according to claim 1, wherein the reference signals associated with the at least two antenna ports comprise a reference signal used for phase noise and/or frequency shift estimation.

4. The method according to claim 3, wherein the reference signals associated with the at least two antenna ports comprise (a) a reference signal used for phase noise and/or frequency shift estimation and (b) a demodulation reference signal.

5. The method according to claim 1, wherein the parameter of one of the at least two antenna ports is deduced by using a parameter of another one of the at least two antenna ports, or a difference between a parameter of the one of the at least two antenna ports and a parameter of the other antenna port is less than a threshold.

6. The method according to claim 1, wherein the parameter is at least one of a delay spread, a Doppler spread, a Doppler frequency shift, an average delay, an average gain, an angle of arrival (AOA), an average AOA, an AOA spread, an angle of departure (AOD), an average AOD, an AOD spread, a correlation parameter of a received antenna space, a beam parameter specific to a transmit beam, a beam parameter specific to a received beam and a resource identifier.

7. The method according to claim 6, wherein the AOA, the average AOA, the AOA spread, the AOD, the average AOD, and the AOD spread are decomposition values at different dimensions or combinations of decomposition values at different dimensions.

8. The method according to claim 6, wherein the beam parameter includes at least one of the following: a precoding matrix, a weight sequence number, and a beam sequence number.

9. The method according to claim 6, wherein the resource identifier includes a channel state information reference signal (CSI-RS) resource identifier or a sound reference signal (SRS) resource identifier, and is used to indicate a beam on a resource,
wherein the CSI-RS or SRS resource identifier indicates a transmit beam used for sending a CSI-RS or SRS on a corresponding time-frequency resource, and/or a receive beam used for receiving a CSI-RS or SRS on a corresponding time-frequency resource.

10. A base station comprising:
at least two antenna ports;
a processor configured to:
generate reference signal configuration information, wherein each piece of reference signal configuration information is associated with one reference signal, and each reference signal is associated with at least one antenna port;
perform, based on the reference signal configuration information, quasi co-location (QCL) assumption on reference signals associated with the at least two antenna ports in the reference signals, wherein each antenna port is associated with at least one reference signal, to generate QCL indication information that includes
(i) information about parameters shared between or among reference signals associated with the at least two antenna ports,
(ii) pattern and type information for each parameter, wherein the pattern information includes time-frequency locations of resource elements for the reference signals, and
wherein the type information includes information about types of the reference signals, wherein the types include a demodulation reference signal, a channel state information reference signal and a beam reference signal, and
(iii) wherein the information about each parameter shared indicates whether the reference signals associated with the shared parameter have (i) different reference signal types, (ii) a same reference signal type and different reference signal patterns or (iii) a same reference signal type and a same reference signal pattern
and
a transceiver configured to cooperate with the processor to send the QCL indication information to a terminal.

11. The base station according to claim 10, wherein the at least two antenna ports are either one of the following groups (a) and (b):
(a) antenna ports with different antenna port numbers, or
(b) antenna ports that have a same antenna port number and that send/receive information (i) at different time, (ii) at different frequencies, and/or (iii) on different code domain resources.

12. The base station according to claim 10, wherein the reference signals associated with the at least two antenna ports comprise a reference signal used for phase noise and/or frequency shift estimation.

13. The base station according to claim 12, wherein the reference signals associated with the at least two antenna ports comprise (a) a reference signal used for phase noise and/or frequency shift estimation and (b) a demodulation reference signal.

14. The base station of claim 10, wherein the processor is further configured to reduce complexity of parsing a reference signal by the terminal by:
indicating information that the at least two antenna ports use a same local oscillator through predefining, by using higher layer signaling, or by using downlink control information;
indicating QCL information of each of the at least two antenna ports by using the QCL indication information; and
grouping the at least two antenna ports, based on the information that the at least two antenna ports use a same local oscillator and the QCL information, to determine a quantity of the at least two antenna ports corresponding to a reference signal used for phase noise and/or frequency shift estimation, thereby providing a group of the at least two antenna ports that are quasi co-located and use a same local oscillator.

15. A terminal comprising:
a receiver configured to cooperate with a processor to receive quasi co-location (QCL) indication information sent by a base station having at least two antenna ports, wherein each antenna port has at least one reference signal,
wherein the QCL indication information includes information about parameters shared between or among reference signals associated with the at least two antenna ports;
wherein the QCL indication information includes pattern and type information for each parameter,
wherein the pattern information includes time-frequency locations of resource elements for the reference signals,
wherein the type information includes information about types of the reference signals, wherein the types include a demodulation reference signal, a channel state information reference signal and a beam reference signal, and
wherein the QCL indication information for each shared parameter indicates whether the reference signals associated with the shared parameter have (i) different reference signal types, (ii) a same reference signal type and different reference signal patterns or (iii) a same reference signal type and a same reference signal pattern; and
the processor configured to determine, based on the QCL indication information, reference signals on which QCL assumption is performed and that are associated with the at least two antenna ports.

16. The terminal according to claim 15, wherein the at least two antenna ports are either one of the following groups (a) or (b):
  (a) antenna ports with different antenna port numbers, or
  (b) antenna ports that have a same antenna port number and that send/receive information (i) at different time, (ii) at different frequencies, and/or (iii) on different code domain resources.

17. The terminal according to claim 15, wherein the reference signals associated with the at least two antenna ports comprise a reference signal used for phase noise and/or frequency shift estimation.

18. The terminal according to claim 17, wherein the reference signals associated with the at least two antenna ports comprise (a) a reference signal used for phase noise and/or frequency shift estimation and (b) a demodulation reference signal.

19. The terminal according to claim 15, wherein the processor is further configured to deduce the parameter of one of the at least two antenna ports by using a parameter of another one of the at least two antenna ports, or a difference between a parameter of the one of the at least two antenna ports and a parameter of the other antenna port is less than a threshold.

20. The terminal according to claim 15, wherein the parameter is at least one of a delay spread, a Doppler spread, a Doppler frequency shift, an average delay, an average gain, an angle of arrival (AOA), an average AOA, an AOA spread, an angle of departure (AOD), an average AOD, an AOD spread, a correlation parameter of a received antenna space, a beam parameter specific to a transmit beam, a beam parameter specific to a received beam and a resource identifier.

* * * * *